Oct. 27, 1925.

J. T. GOYETTE 1,558,864

EMERGENCY WHEEL

Filed July 29, 1924

Jean T. Goyette, Inventor

By Clarence A. O'Brien, Attorney

Patented Oct. 27, 1925.

1,558,864

UNITED STATES PATENT OFFICE.

JEAN T. GOYETTE, OF CAMBRIDGE, MASSACHUSETTS.

EMERGENCY WHEEL.

Application filed July 29, 1924. Serial No. 728,913.

*To all whom it may concern:*

Be it known that I, JEAN T. GOYETTE, a citizen of the United States, residing at Cambridge, in the county of Suffolk and State of Massachusetts, have invented certain new and useful Improvements in an Emergency Wheel, of which the following is a specification.

This invention relates to an improved emergency wheel adapted for attachment to an automobile wheel when tire trouble is experienced.

It is my object to generally improve upon wheels of this class by providing one of extreme simplicity and durability which is capable of being readily attached and detached and one which is of a diameter to properly space the main tire off of the ground so that it will not be subjected to wear and further disruption.

Other features and advantages of the invention will become apparent from the following description and drawing.

In the accompanying drawing forming a part of this application and in which like numerals are employed to designate like parts throughout the same:

Figure 1:
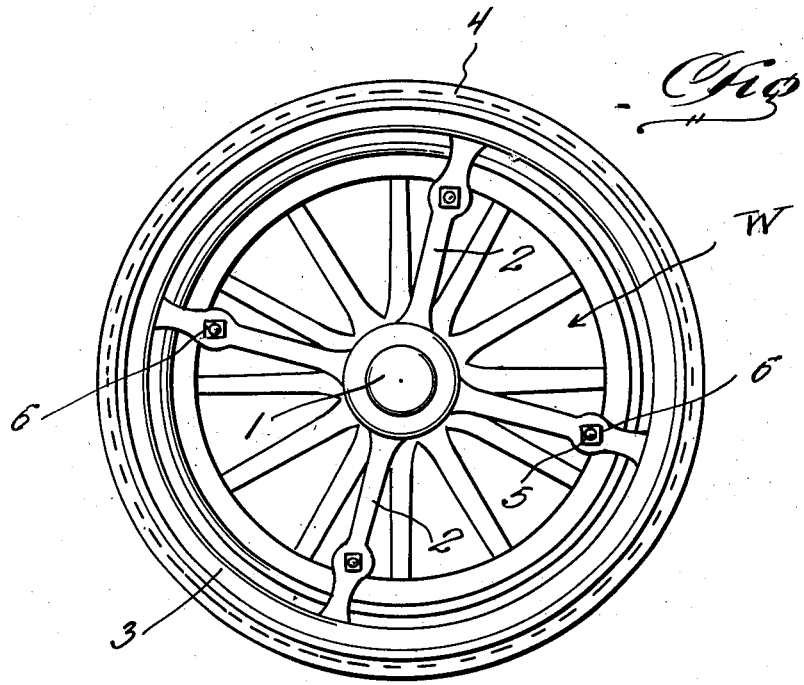
Figure 1 is a side elevation of the improved emergency wheel showing the same attached to an automobile wheel.

In the drawings, the letter W designates generally a conventional type of automobile wheel including the felly F for supporting the tire and the usual hub H.

The emergency wheel comprises a central cup-shaped hub covering cap 1 from which a plurality of spokes 2 radiate. The spokes are connected at their outer ends to a felly 3 which preferably carries a solid tire 4. It is to be observed that the emergency wheel is of a greater diameter than the automobile wheel W so that the tire 4 at least will extend beyond the corresponding element of the automobile wheel. Hence, when the device is in place, it will space the tire of the automobile wheel off of the ground to relieve it of unnecessary wear and further destruction. The spokes 2 are formed slightly inward of the rim 3 with transverse holes through which the threaded shanks of the retaining bolts pass. The retaining bolts are provided with hooked ends 5 adapted to engage the felly F, and binding nuts 6 are threaded on the free ends thereof as shown.

Figure 2:
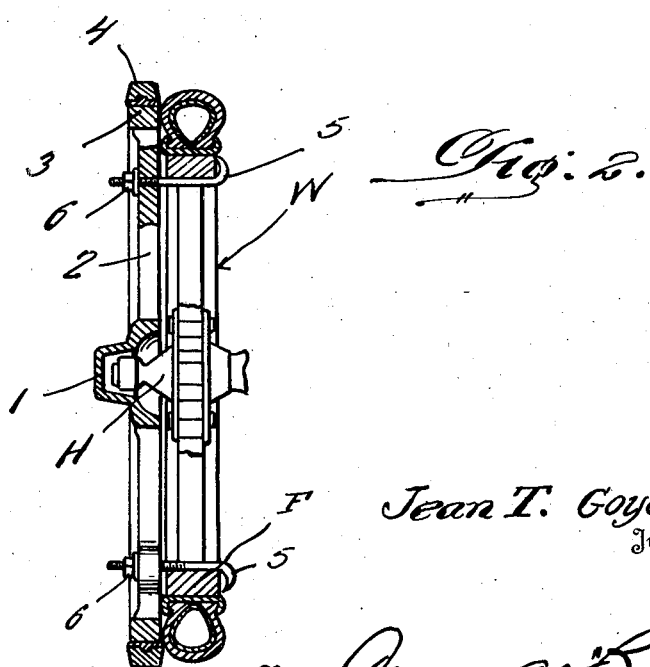
Figure 2 is a central vertical section thereof.

In practice, the emergency wheel is quickly attached to the automobile wheel as seen in Figure 2 so that the cap or cup 1 receives the hub of the automobile wheel, the retaining bolt being engaged with the felly of the latter so that it is raised off of the ground and the emergency wheel brought into place to enable the vehicle to reach its destination without necessitating the repair of the tire or requiring its removal. This emergency wheel will be especially useful in cases where no spare tire is carried.

It is thought that the description taken in connection with the accompanying drawing will enable persons skilled in the art to which the invention relates to obtain a clear understanding of the same, for this reason I do not deem it necessary to enter a more lengthy description.

Having thus described the invention, what I claim is:—

An emergency vehicle wheel embodying a central cup shaped cap for reception of the hub of the vehicle wheel, a rim, a plurality of radiating spokes connected at their inner ends to said cap and at their outer ends to said rim, said spokes being provided with transverse holes inward of said rim, a tire carried by said rim, and a plurality of hooked retaining bolts carried by said spokes and having their shanks extending through the holes in the latter.

In testimony whereof I affix my signature.

JEAN T. GOYETTE.